United States Patent Office 2,760,973
Patented Aug. 28, 1956

2,760,973

1-ACYLOXY-4-HYDROXY-2-ALKOXY-4a-METHYL-1,4,4a,5,8,8a-HEXAHYDRONAPHTHALENES AND THEIR PRODUCTION

Ferdinand C. Meyer and Angelo J. Speziale, Kirkwood, Mo., assignors to Monsanto Chemical Company, St. Louis, Mo., a corporation of Delaware No Drawing. Application December 14, 1953, Serial No. 398,198

11 Claims. (Cl. 260—488)

This invention relates to new and useful mono-carboxylic acid esters of dihydroxy substituted carbocyclic bicyclic compounds. More specifically this invention relates to 1-acyloxy - 4 - hydroxy-2-alkoxy-4a-methyl-1,4,4a,5,8,8a-hexahydronaphthalenes, which mono-esters may be represented by the structural formula

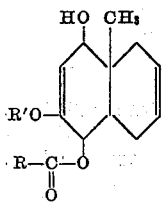

where R is hydrogen or a hydrocarbon radical such as the alkyl, aralkyl, cycloalkyl, aryl, and alkaryl radicals, and where R' is a short chain alkyl radical such as methyl, ethyl, propyl, butyl, amyl, etc.

It will be obvious to those skilled in the art that the new compounds of this invention contain four optically active carbon atoms. As a result thereof these compounds may exist in sixteen optically active forms or eight racemates. All such forms and any mixture thereof of the new esters are contemplated as coming within the scope of this invention.

The new esters are useful plasticizers for cellulose nitrate.

The trans esters are particularly useful for the preparation of the corresponding trans bicyclic ketones. The notation "trans" as used in this specification and appended claims indicates the spatial configuration of CH3 at position 4a with respect to the 8a H substituent in the structural formula. These trans bicyclic ketones, which may be represented structurally as follows

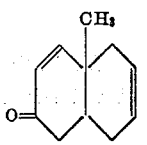

are useful intermediates in the synthesis of steroids (J. A. C. S. 74, September 1952, p. 4223). The conversion of the trans esters to the corresponding trans bicyclic ketones may be represented schematically as follows, R and R' having the same significance as aforedescribed,

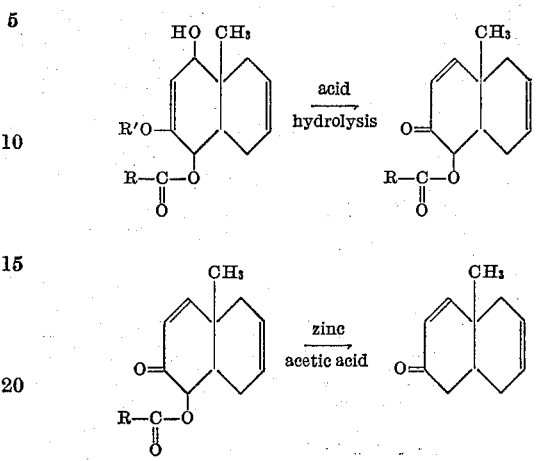

The new esters of this invention are prepared by the reduction of the 4-keto substituent of the corresponding 1-acyloxy-4-keto-2-alkoxy-4a-methyl-1,4,4a,5,8,8a - hexahydronaphthalene, which compounds are described and claimed in co-pending application Serial No. 314,416, filed October 11, 1952, employing an aluminum alkoxide of the formula Al(OR")3 where R" is a short chain alkyl radical such as ethyl, propyl, sec. butyl, etc. The preferred alkoxide is aluminum isopropoxide. Although the quantity of aluminum alkoxide may vary widely, ordinarily its molar ratio to the 4-keto reactant will be in the range of about 1 to 3:1. It is preferred that the molar ratio be in the range of about 2 of aluminum alkoxide to 1 of the 4-keto reactant.

In general anhydrous isopropanol will be employed as the solvent in the preparation of the new esters, however, other anhydrous inert organic solvents may be employed, for example isobutyl alcohol, ethyl alcohol, toluene, xylene and the like as well as mixtures thereof. Ordinarily the temperature at which the reaction is conducted will be in the range of about 40 to about 150° C. and preferably at the reflux temperature of the system.

As illustrative of the new esters and the preparation thereof is the following

Example 1

To a suitable reaction vessel containing approximately 79 parts by weight of anhydrous isopropanol and approximately 16.7 parts by weight of dl-trans-1-butyryloxy-4-keto - 2 - methoxy-4a-methyl-1,4,4a,5,8,8a-hexahydronaphthalene (substantially 0.06 mol) is added and intimately mixed 16.3 parts by weight of aluminum isopropoxide (substantially 0.08 mol). The mix is then refluxed while permitting the acetone formed to slowly distil off. During the refluxing period (about 17 hours) approximately 79 parts by weight of anhydrous isopropanol is added. The reaction mix is cooled to about 5–10° C. and thereto is added 79 parts by weight of a mixture of isopropanol and water in a weight ratio of 4:1. The precipitated aluminum hydroxide is filtered off and the collected residue washed with 158 parts by weight of anhydrous isopropanol. The washings and original filtrate are combined and subjected to vacuum distillation. The light colored oil (a 77% of theory yield) is *dl*-trans-1-butyryloxy - 4 - hydroxy - 2 - methoxy - 4a - methyl-1,4,4a,5,8,8a-hexahydronaphthalene.

*Example II*

To a suitable reaction vessel containing approximately 86 parts by weight of anhydrous toluene and approximately 10 parts by weight of *dl*-trans-1-acetyloxy-4-keto-2-methoxy-4a-methyl - 1,4,4a,5,8,8a - hexahydronaphthalene (substantially 0.04 mol) is added and intimately mixed 16.3 parts by weight of aluminum isopropoxide (substantially 0.08 mol). The mix is then refluxed while permitting the acetone formed to slowly distil off. The reaction mix is cooled to about 5–10° C. and thereto is added 50 parts by weight of water and 43 parts by weight of toluene. The precipitated aluminum hydroxide is filtered off and the collected residue washed with 160 parts by weight of methanol. The washings and original filtrate are combined and subjected to vacuum distillation. The oily residue (a 53% of theory yield) is *dl*-trans-1-acetyloxy - 4 - hydroxy - 2 - methoxy-4a-methyl-1,4,4a,5,8,8a-hexahydronaphthalene.

In addition to the esters prepared in the preceding examples, the following examples are further illustrations of compounds coming within the scope of this invention:

1-n-propanoyloxy-4-hydroxy - 2 - methoxy-4a-methyl-1,4,4a,5,8,8a-hexahydronaphthalene.

1-isobutyryloxy - 4 - hydroxy - 2 - ethoxy-4a-methyl-1,4,4a,5,8,8a-hexahydronaphthalene.

1-n-pentanoyloxy - 4 - hydroxy-2-methoxy-4a-methyl-1,4,4a,5,8,8a-hexahydronaphthalene.

1-(2-ethyl-hexanoyloxy) - 4 - hydroxy-2-n-propoxy-4a-methyl-1,4,4a,5,8,8a-hexahydronaphthalene.

1-n-octanoyloxy-4-hydroxy - 2 - methoxy-4a-methyl-1,4,4a,5,8,8a-hexahydronaphthalene.

1-n-decanoyloxy - 4-hydroxy - 2 - methoxy-4a-methyl-1,4,4a,5,8,8a-hexahydronaphthalene.

1-n-octadecanoyloxy - 4-hydroxy-2-methoxy-4a-methyl-1,4,4a,5,8,8a-hexahydronaphthalene.

1-naphthoyloxy-4-hydroxy - 2 - methoxy - 4a - methyl-1,4,4a,5,8,8a-hexahydronaphthalene.

1-formyloxy-4-hydroxy - 2 - n - butoxy - 4a - methyl-1,4,4a,5,8,8a-hexahydronaphthalene.

1-caproyloxy - 4 - hydroxy - 2 - methoxy-4a-methyl-1,4,4a,5,8,8a-hexahydronaphthalene.

1-benzoyloxy - 4 - hydroxy - 2 - ethoxy-4a-methyl-1,4,4a,5,8,8a-hexahydronaphthalene.

1-p-toluyloxy - 4 - hydroxy-2-methoxy - 4a - methyl-1,4,4a,5,8,8a-hexahydronaphthalene.

1-cyclohexanoyloxy - 4 - hydroxy-2-ethoxy-4a-methyl-1,4,4a,5,8,8a-hexahydronaphthalene.

1-phenylacetyloxy - 4 - hydroxy-2-methoxy-4a-methyl-1,4,4a,5,8,8a-hexahydronaphthalene.

1-phenylpropanoyloxy-4-hydroxy-2-methoxy-4a-methyl-1,4,4a,5,8,8a-hexahydronaphthalene.

The new esters of this invention where R is an alkane radical containing 1–17 carbon atoms represent a preferred embodiment of this invention. Of this preferred embodiment the esters wherein R is an alkane radical containing 3–7 carbon atoms have been found particularly useful.

Although the preceding examples have described certain specific embodiments of this invention both as to the nature of the novel esters and their method of preparation, it is to be understood that substantial variations obvious to those skilled in the art in the reactants and reaction conditions may be made without departing from the spirit or scope of this invention.

What is claimed is:

1. As new compounds 1-acyloxy-2-alkoxy-4-hydroxy-4a - methyl- -1,4,4a,5,8,8a-hexahydronaphthalenes of the structural formula

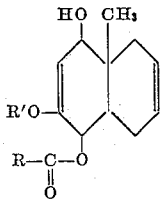

where R is a member of the group consisting of hydrogen and hydrocarbon radicals and where R' is a short chain alkyl radical.

2. As new compounds 1-acyloxy-2-methoxy-4-hydroxy-4a-methyl - 1,4,4a,5,8,8a - hexahydronaphthalenes of the structural formula

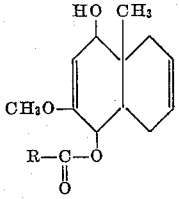

where R is an alkyl radical containing 1 to 17 carbon atoms.

3. The trans isomers of the esters of claim 2.

4. As new compounds esters of claim 2 where R is an alkane radical containing 3 to 7 carbon atoms.

5. 1-acetyloxy - 4 - hydroxy - 2 - methoxy-4a-methyl-1,4,4a,5,8,8a-hexahydronaphthalene.

6. 1-n-butyryloxy - 4 - hydroxy-2-methoxy-4a-methyl-1,4,4a,5,8,8a-hexahydronaphthalene.

7. *dl*-Trans - 1 - acetyloxy-4-hydroxy-2-methoxy - 4a-methyl-1,4,4a,5,8,8a-hexahydronaphthalene.

8. *dl*-Trans-1-n-butyryloxy-4-hydroxy-2 - methoxy - 4a-methyl-1,4,4a,5,8,8a-hexahydronaphthalene.

9. The process of making the esters of claim 2 which comprises reacting a keto-ester of the formula

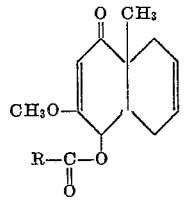

where R is an alkyl radical containing from 1 to 17 carbon atoms with an aluminum short-chain alkoxide.

10. The process of claim 9 employing a reaction temperature in the range from about 40° C. to 150° C.

11. The process of making the ester of claim 9 which comprises refluxing *dl*-trans - 1 - n-butyryloxy-4-keto-2-methoxy-4a-methyl-1,4,4a,5,8,8a - hexahydronaphthalene with aluminum isopropoxide in isopropanol.

References Cited in the file of this patent
UNITED STATES PATENTS
2,672,482    Woodward _____ Mar. 16, 1954

OTHER REFERENCES
Woodward et al.: J. Am. Chem. Soc., 74 (1952), 4223.